United States Patent [19]

Goebel

[11] 4,376,811

[45] Mar. 15, 1983

[54] ELECTROCHEMICAL CELL

[75] Inventor: Franz Goebel, Sudbury, Mass.

[73] Assignee: GTE Products Corporation, Stamford, Conn.

[21] Appl. No.: 333,094

[22] Filed: Dec. 21, 1981

[51] Int. Cl.³ .............................................. H01M 2/30
[52] U.S. Cl. ....................................... 429/101; 429/178
[58] Field of Search ............... 429/101, 105, 196, 181, 429/178, 211, 94

[56] References Cited

U.S. PATENT DOCUMENTS

| | | | |
|---|---|---|---|
| 3,874,929 | 4/1975 | Greatbatch | 429/101 |
| 4,032,695 | 6/1977 | Coibion | 429/178 |
| 4,060,668 | 11/1977 | Goebel | 429/194 |
| 4,168,351 | 9/1979 | Taylor | 429/181 |
| 4,263,378 | 4/1981 | Feiman et al. | 429/196 |
| 4,292,346 | 9/1981 | Athearn | 429/101 |
| 4,307,161 | 12/1981 | Athearn | 429/101 |

*Primary Examiner*—Donald L. Walton
*Attorney, Agent, or Firm*—Peter Xiarhos; David M. Keay

[57] ABSTRACT

A primary electrochemical cell of a design for reducing parasitic self-discharge of the cell during storage and subsequent discharge of the cell. The cell includes a tubular porous carbon cathode structure disposed within a metal housing of the cell and spaced from an anode structure by an insulative separator material. The carbon cathode structure and the anode structure are exposed to an electrolytic solution including a reducible soluble cathode (e.g., thionyl chloride) which is catalytically reduced at the surface of the carbon cathode structure during discharge of the cell.

The anode structure includes an elongated, cylindrical, lithium electrode located centrally within, and spaced from, the housing; an elongated solid or hollow glass or ceramic member having a first portion embedded within the lithium electrode and a second portion extending outwardly from the lithium electrode; an electrically-conductive metal material disposed on the first portion of the glass or ceramic member and in physical and electrical contact with the lithium electrode; and an electrically-conductive, flexible, metal jumper element connected between the electrically-conductive metal material and an elongated metal feedthrough member in a top cover of the cell. The jumper element and the feedthrough member are selectively covered with a sufficiently chemically-stable, catalytically-inert antiparasitic discharge material for preventing the undesirable catalytic reduction of the soluble cathode at the surfaces of the jumper element and feedthrough member covered by the anti-parasitic discharge material.

25 Claims, 1 Drawing Figure

U.S. Patent    Mar. 15, 1983    4,376,811
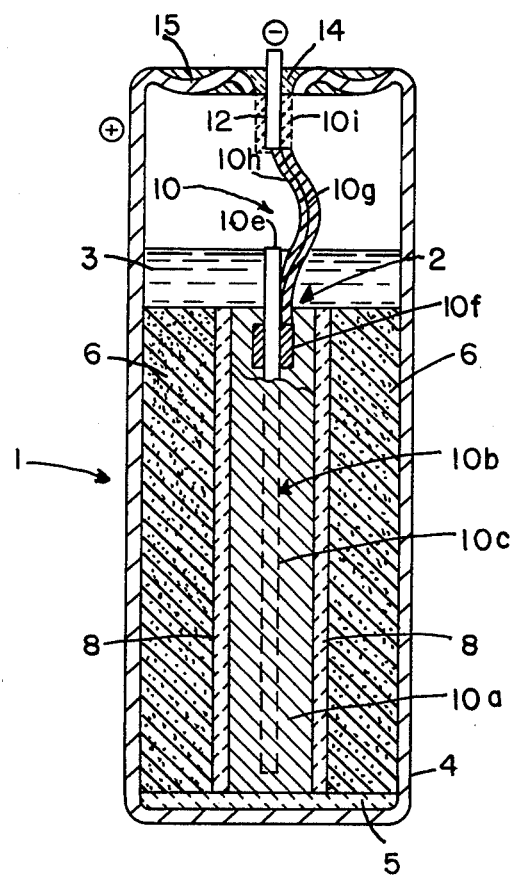

ELECTROCHEMICAL CELL

CROSS REFERENCE TO RELATED APPLICATIONS

In co-pending applications Ser. No. 333,093 and Ser. No. 333,160, filed concurrently herewith in the names of Franz Goebel and Kathleen M. Kealey, and entitled "ELECTROCHEMICAL CELL", there are disclosed and claimed electrochemical cells similar to an electrochemical cell as disclosed and claimed in the present application.

FIELD OF THE INVENTION

The present invention relates to an electrochemical cell and, more particularly, to a primary electrochemical cell of a construction for reducing parasitic, self-discharge of the cell during storage and subsequent discharge of the cell.

BACKGROUND OF THE INVENTION

Primary electrochemical cells are utilized for a wide variety of applications and are commonly available in a large assortment of sizes and shapes. One well known form of an electrochemical cell is a cylindrical cell. Such a cell is disclosed in U.S. Pat. No. 4,060,668 in the name of Franz Goebel and assigned to GTE Laboratories Incorporated. The cylindrical cell as disclosed in the above-mentioned patent includes a lithium anode, a carbon current collector cathode structure, and a separator interposed between the lithium anode and the carbon current collector cathode structure. The lithium anode takes the form of a cylindrical sheet physically pressed against an interior wall of a metal housing of the cell, and is arranged concentrically within the housing with the carbon current collector cathode structure and the separator. The assembly of the lithium anode, carbon current collector cathode structure and separator as described hereinabove is exposed to an electrolytic solution including a reducible soluble cathode and an electrolyte solute dissolved in the reducible soluble cathode. Suitable materials for the reducible soluble cathode and the electrolyte solute are thionyl chloride and lithium tetrachloroaluminate, respectively.

In the normal discharge of a cell such as described hereinabove, the reducible soluble cathode, such as the thionyl chloride, is catalytically reduced at the surface of the carbon current collector cathode structure. This catalytic reduction results, inter alia, in the formation of a variety of reaction products within the cell and a physical and volumetric depletion of the thionyl chloride and lithium. The life span of the cell is to a large degree dictated by the amount of lithium and thionyl chloride initially present in the cell and the rate at which the thionyl chloride and lithium are depleted by electrochemical action within the cell.

As the above-mentioned catalytic reduction of the thionyl chloride takes place at the surface of the carbon current collector cathode structure, a further, and undesirable, reduction of the thionyl chloride also takes place at those metallic portions and surfaces of the cell in physical contact with the lithium anode, that is, at the potential of the lithium anode, but not covered by the lithium anode. These portions and surfaces may include, by way of example, the bottom of the metal (e.g., stainless steel) housing of the cell and metal portions of the housing above the lithium anode. This latter reduction of the thionyl chloride, which may take place prior to normal discharge of the cell, that is, during storage of the cell, is a parasitic self-discharge reaction and can lead to an undesirable capacity loss and a premature termination of the rated life span of the cell. The rate of this self-discharge is directly proportional to the metallic area of the cell at the potential of the lithium anode, but not covered by the lithium of the anode. It is highly advantageous and desirable, therefore, that those areas of the cell at the potential of the lithium anode and at which the above-mentioned self-discharge catalytic reduction of the thionyl chloride takes place be kept to a minimum so as not to unnecessarily prematurely shorten the life span of the cell.

BRIEF SUMMARY OF THE INVENTION

In accordance with the present invention, an electrochemical cell is provided which overcomes or substantially alleviates parasitic self-discharge problems as associated with prior art cells as briefly described hereinabove.

An electrochemical cell in accordance with the present invention generally includes a metal housing, a cover for the housing having a metal electrical terminal extending therethrough, and an electrochemical system within the housing. The electrochemical system includes an electrolytic solution containing a catalytically-reducible soluble cathode, and a battery stack exposed to the electrolytic solution. The battery stack as employed within the cell generally includes a cathode structure adjacent to the metal housing and an anode structure. The cathode structure operates during discharge of the cell to catalytically reduce the soluble cathode of the electrolytic solution. The anode structure comprises a metal electrode spaced from the cathode structure and the metal housing; an electrically-nonconductive member disposed within the metal electrode; and electrically-conductive metal material at the potential of the metal electrode and disposed on the electrically-nonconductive member and in physical and electrical contact with the metal electrode; an electrically-conductive, metal jumper element at the potential of the metal electrode and connected between the electrically-conductive metal material and the electrical terminal in the cover; and a chemically-stable, antiparasitic discharge material disposed on the metal jumper element. The anti-parasitic discharge material operates in accordance with the invention to prevent the catalytic reduction of the soluble cathode in the electrolytic solution at the surface of the jumper element covered by the anti-parasitic discharge material.

BRIEF DESCRIPTION OF THE DRAWING

The single FIGURE of the drawing is an elevational view, partly in cross section, of a primary electrochemical cell of a design for minimizing or substantially reducing parasitic self-discharge of the cell.

DETAILED DESCRIPTION OF THE INVENTION

Referring now to the single FIGURE, there is shown a primary electrochemical cell 1 in accordance with the present invention. As shown in the FIGURE, the electrochemical cell 1 includes a battery stack 2 employed together with an electrolytic solution 3 within an elongated cylindrical metal casing or housing 4 of the cell 1. The battery stack 2 and the electrolytic solution 3 collectively represent the electrochemical system of the cell. The battery stack 2 employed within the cell 1 is insulated from the housing of the cell by a suitable porous insulator 5 (e.g., of fiberglass), and generally includes a concentric arrangement of a porous carbon cathode structure 6, a thin porous separator 8, and an anode structure 10. As will be discussed in detail hereinafter, the anode structure 10 is constructed in accordance with the invention so as to minimize or substantially reduce parasitic self-discharge of the cell 1 during both storage and subsequent normal discharge of the cell.

The aforementioned porous carbon cathode structure 6 is a generally cylindrical, elongated tubular member comprising an aggregation of discrete, semi-rigid, porous carbon conglomerates. These conglomerates generally contain a combination of carbon black, graphite, and a binder such as "Teflon". The carbon cathode structure 6 may be formed from the conglomerates into a single-piece component as shown in the FIGURE or, alternatively, the carbon cathode structure 6 may be constructed of a pre-selected number of individual annular or "donut" shaped discs superimposed upon each other in a vertical stacked array to effectively form a single carbon cathode structure of essentially any desired overall length. Suitable approximate dimensions for the carbon cathode structure 6 for an AA-size cell are a length of 1.5 inch, an outside diameter of 0.5 inch, and an inside diameter of 0.3 inch. Because of the porous nature of the constituent components of the conglomerates used to form the carbon cathode structure 6, the carbon cathode structure 6 has a resultant network of electrolyte-conducting channels formed therein whereby the carbon cathode structure 6 can be readily permeated by the electrolytic solution 3. Techniques for producing the conglomerates employed by the carbon cathode structure 6 are described in U.S. Pat. No. 4,161,063 to which reference may be made for specific details.

The aforementioned porous separator 8 is disposed intermediate to the carbon cathode structure 6 and the anode structure 10 and is used to electrically isolate the carbon cathode structure 6 from the anode structure 10. The separator 8 typically takes the form of a cylindrical sheet of a standard, electrically non-conductive material such as fiberglass.

The anode structure 10 as utilized within the cell 1 is located centrally within the cell 1 and, as shown in the drawing, generally includes a solid, elongated, cylindrical, metal electrode 10a; an elongated electrically-non-conductive member 10b having a major portion 10c thereof completely embedded within the electrode 10a and the remaining portion, designated 10e, extending outwardly from the electrode 10a; an electrically-conductive material 10f disposed on a small section of the portion 10c of the member 10b and in physical and electrical contact with the metal electrode 10a; a thin, flexible, electrically-conductive metal jumper element 10g physically and electrically connected between the electrically-conductive material 10f and an elongated, hollow, metal feedthrough member 12; and an anti-parasitic discharge material 10h disposed on the jumper element 10g.

The electrode 10a of the anode structure 10 is typically of an oxidizable active alkali metal such as lithium. Suitable approximate dimensions for the electrode 10a are a length of 1.5 inches and a diameter of 0.3 inch.

The aforementioned electrically-nonconductive member 10b may take the form of a solid glass or ceramic rod or a hollow glass or ceramic tube. The tube form of the member 10b may be preferred for many applications in which it is desired to provide an additional amount of electrolytic solution in the cell, for example, to increase the efficiency of utilization (depletion) of the lithium in the cell. In this case, the hollow tube serves as a simple and convenient reservoir or cavity for the retention therein of the additional or excess amount of electrolytic solution. Suitable approximate dimensions for the member 10b are a lenfth of 1.5 inches, an outside diameter of 0.125 inch, and an inside diameter (for a hollow tube) of 0.05 inch.

The aforementioned electrically-conductive material 10f disposed on the portion 10c of the member 10b (and shown in dotted form in the drawing) may take the form of an electrically-conductive metal coating or, alternatively, an elongated thin metal wire or strip wound or wrapped about the portion 10c of the member 10b. A suitable material for the metal coating or wire or strip is nickel, and a suitable thickness therefor is 0.005 inch.

The aforementioned jumper element 10g may be of nickel and in the form of a wire or flat ribbon, and may be secured to the electrically-conductive material 10f in any suitable manner. By way of example, a first end of of the jumper element 10g may simply be welded directly to the material 10f or, alternatively, embedded together with the material 10f within the lithium electrode 10a as generally indicated in the drawing. The other end of the jumper element 10g is secured, as by welding, to the aforementioned cylindrical, hollow, metal (e.g., nickel) feedthrough member 12. The feedthrough member itself passes through a standard insulative glass or ceramic-to-metal seal 14 provided within an hermetically sealed metal cap or cover 15 of the cell 1.

The jumper element 10g, by virtue of its non-rigid, flexible nature and small thickness, for example, 0.005-0.015 inch, serves to absorb any shock or vibration to which the cell 1 might be exposed, thereby to prevent a break in the physical and electrical connection between the electrically-conductive material 10f and the feedthrough member 12, and also to minimize the possibility of physical damage (e.g., breakage) to the glass or ceramic-to-metal seal 14 due to such factors as shock and vibration. The hollow nature of the feedthrough member 12 as described hereinabove serves to permit the introduction of the electrolytic solution 3 into the cell 1 for permeating the porous components of the battery stack 2 and, if the electrically-nonconductive member 10b is in the form of a hollow tube, to fill the cavity in the tube with electrolytic solution. Following the above filling operation, the feedthrough member 12 is closed at its outside opening, as by welding. The feedthrough member 12 thereupon serves as the negative terminal of the cell 1. The housing 4 of the cell 1, which may be of stainless steel and against which the aforedescribed carbon cathode structure 6 physically abuts, serves as the positive terminal of the cell 1.

A suitable and preferred electrolytic solution 3 which may be used with the above-described cell 1 is a cathodelectrolyte solution including a reducible soluble cathode, such as thionyl chloride, and an electrolyte solute, such as lithium tetrachloroaluminate, dissolved in the thionyl chloride.

The aforementioned anti-parasitic discharge material 10h is selected to be of a sufficiently stable, catalytically-inert material which does not react chemically in an adverse or harmful fashion with the particular electrolytic solution 3 or reaction products produced during discharge of the cell 1. The material 10h serves, in a manner to be described more fully hereinafter, to minimize or substantially reduce the amount of exposed surface area of the anode structure 10 at which undesirable parasitic self-discharge of the cell 1 can take place, during both storage and subsequent discharge of the cell 1. Suitable substances which have the desirable chemical characteristics and which may be used for the anti-parasitic discharge material 10h include lithium, and plastics such as ethylene chlorotrifluoroethylene, or ECFE ("Halar"), and a copolymer of ethylene and polytetrafluoroethylene ("Tefzel"). The particular substance selected for the anti-parasitic discharge material 10h should have a thickness as not to impair or destroy the flexible character of the jumper element 10g, a typical thickness being 0.003 inch.

In the operation of the cell 1 as described hereinabove, specifically, during normal discharge of the cell 1, the reducible soluble cathode, namely, the thionyl chloride, is catalytically reduced principally at the surface of the carbon cathode structure 6. The catalytic reduction results, inter alia, in the formation of a variety of reaction products within the cell and, as determined by the rate of this catalytic reduction, a gradual depletion of the metal, e.g., lithium, of the electrode 10a and the thionyl chloride. The complete depletion or consumption of either one or both of these consumable components determines the end of the useful life of the cell. Thus, it is highly desirable to extend the period of time over which the depletion of the lithium and thionyl chloride takes place so that capacity losses are minimized and a long life for the cell is reasonably guaranteed. Consistent with this objective, it is important and desirable to minimize parasitic self-discharge of the cell 1 occurring at surfaces or areas other than the surface of the carbon cathode structure 6.

In accordance with the present invention, the extent of parasitic self-discharge of the cell 1 is minimized or substantially reduced by: (1) centrally locating and positioning the lithium electrode 10a of the anode structure 10 relative to the other components of the cell 1 such that as little of the lithium electrode 10a as possible is in physical contact with metal parts or portions of the cell (such as the housing 4) at which the parasitic self-discharge activity might take place; and (2) utilizing the anti-parasitic discharge material 10h on the surface of the jumper element 10g for minimizing the extent of the parasitic self-discharge activity at this surface. It will be noted that parasitic self-discharge activity does not occur at the surface of the portion 10e of the glass or ceramic member 10b since the member 10b is non-metallic, that is, electrically-nonconductive.

If the cell 1 as described hereinabove is to be stored and/or subsequently used in a vertcal upright position, it is not generally necessary that the feedthrough member 12 be covered with the anti-parasitic discharge material 10h as described hereinabove since the electrolytic solution 3 (containing the reducible thionyl chloride) is generally at a level below the feedthrough member 12 and this level is lowered by depletion of the thionyl chloride during normal discharge of the cell. In this case, the anti-parasitic discharge material 10h need only be applied to the surface of the jumper element 10g as previously discussed. However, in the event a vertical storage and/or operating position of the cell cannot be guaranteed, as is usually the case, it is normally desirable to further reduce the amount of surface area metal at which parasitic self-discharge activity can possibly take place. In such an instance, it is desirable to cover both the jumper element 10b and, as shown in dotted outline at 10i in the drawing, the feedthrough member 12. As an alternative to covering the feedthrough member 12 with the anti-parasitic discharge material 10h, the ceramic or glass-to-metal seal 14 could be lengthened to cover a greater portion of the feedthrough member 12 than is shown in the drawing.

While there has been described what is considered to be a preferred embodiment of the invention, it will be apparent to those skilled in the art that various changes and modifications may be made therein without departing from the invention as called for in the appended claims.

What is claimed is:

1. An electrochemical cell, comprising:
   a metal housing and a cover for said housing, said cover having a metal electrical terminal extending therethrough; and
   an electrochemical system within the metal housing and including an electrolytic solution and a battery stack exposed to the electrolytic solution, said electrolytic solution including a catalytically-reducible soluble cathode, and said battery stack comprising:
   a cathode structure adjacent to the metal housing and operative during discharge of the cell to catalytically reduce the soluble cathode of the electrolytic solution; and
   an anode structure comprising:
   a metal electrode spaced from the cathode structure and the metal housing;
   an electrically-nonconductive member disposed within the metal electrode;
   an electrically-conductive metal material at the potential of the metal electrode and disposed on the electrically-nonconductive member and in physical and electrical contact with the metal electrode;
   an electrically-conductive, metal jumper element at the potential of the metal electrode and connected between the electrically-conductive metal material and the electrical terminal in the cover; and
   a chemically-stable, anti-parasitic discharge material disposed on the metal jumper element and operative to prevent the catalytic reduction of the soluble cathode in the electrolytic solution at the surface of the jumper element covered by the anti-parasitic discharge material.

2. An electrochemical cell in accordance with claim 1 wherein:
   the reducible soluble cathode in the electrolytic solution is thionyl chloride;
   the cathode structure comprises an aggregation of porous carbon conglomerates permeable by the electrolytic solution and defining a surface area for the catalytic reduction of the thionyl chloride in the electrolytic solution; and
   the metal electrode includes an alkali metal.

3. An electrochemical cell in accordance with claim 2 wherein:
   the alkali metal of the metal electrode is lithium.

4. An electrochemical cell in accordance with claim 3 wherein:
   the anti-parasitic discharge material is selected from the group consisting of a metal, ethylene chlorotrifluoroethylene, and a copolymer of ethylene and polytetrafluoroethylene.

5. An electrochemical cell in accordance with claim 4 wherein:
the metal of the group of anti-parasitic discharge materials is lithium.

6. An electrochemical cell in accordance with claim 5 wherein:
the metal housing is an elongated cylindrical housing;
the carbon cathode structure is an elongated, cylindrical, tubular member;
the lithium electrode is an elongated, cylindrical member;
the electrically-nonconductive member is an elongated member having a first portion embedded within the elongated, cylindrical lithium electrode and a second portion extending outwardly from the lithium electrode;
the electrically-conductive metal material is disposed on the first portion of the elongated, nonconductive member and in physical and electrical contact with the elongated lithium electrode; and
the jumper element is a flexible, electrically-conductive metal element connected between the electrically-conductive metal material and the electrical terminal in the cover.

7. An electrochemical cell in accordance with claim 6 wherein:
the elongated electrically-nonconductive member is a solid, elongated rod.

8. An electrochemical cell in accordance with claim 6 wherein:
the elongated electrically-nonconductive rod is of glass.

9. An electrochemical cell in accordance with claim 7 wherein:
the elongated electrically-nonconductive rod is of a ceramic material.

10. An electrochemical cell in accordance with claim 6 wherein:
the elongated electrically-nonconductive member is an elongated tube defining a central reservoir for receiving and retaining therein an excess of the electrolytic solution.

11. An electrochemical cell in accordance with claim 10 wherein:
the elongated electrically-nonconductive tube is of glass.

12. An electrochemical cell in accordance with claim 10 wherein:
the elongated electrically-nonconductive tube is of a ceramic material.

13. An electrochemical cell in accordance with claim 6 wherein:
the metal electrical terminal in the cover is an elongated cylindrical terminal;
and further comprising:
means disposed on the surface of the elongated cylindrical electrical terminal for preventing the catalytic reduction of the soluble cathode in the electrolytic solution at the surface of the metal terminal covered by said means.

14. An electrochemical cell, comprising:
a metal housing and a cover for said housing, said cover having an elongated metal electrical terminal extending therethrough; and
an electrochemical system within the metal housing and including an electrolytic solution and a battery stack exposed to the electrolytic solution, said electrolytic solution including a catalytically-reducible soluble cathode, and said battery stack comprising:
a cathode structure adjacent to the metal housing and operative during discharge of the cell to catalytically reduce the soluble cathode of the electrolytic solution; and
an anode structure comprising:
a metal electrode spaced from the cathode structure and the metal housing;
an electrically-nonconductive member disposed within the metal electrode;
an electrically-conductive metal material at the potential of the metal electrode and disposed on the electrically-nonconductive member and in physical and electrical contact with the metal electrode; and
an electrically-conductive, metal jumper element at the potential of the metal electrode and connected between the electrically-conductive metal material and the electrical terminal in the cover; and
a chemically-stable, anti-parasitic discharge material covering the electrically-conductive metal jumper element and the elongated metal electrical terminal in the cover and operative to prevent the catalytic reduction of the soluble cathode in the electrolytic solution at the surfaces covered by the anti-parasitic discharge material.

15. An electrochemical cell in accordance with claim 14 wherein:
the reducible soluble cathode in the electrolytic solution is thionyl chloride;
the cathode structure comprises an aggregation of porous carbon conglomerates permeable by the electrolytic solution and defining a surface area for the catalytic reduction of the thionyl chloride in the electrolytic solution; and
the metal electrode includes an alkali metal.

16. An electrochemical cell in accordance with claim 15 wherein:
the alkali metal of the metal electrode is lithium.

17. An electrochemical cell in accordance with claim 16 wherein:
the anti-parasitic discharge material is selected from the group consisting of a metal, ethylene chlorotrifluoroethylene, and a copolymer of ethylene and polytetrafluoroethylene.

18. An electrochemical cell in accordance with claim 17 wherein:
the metal of the group of anti-parasitic discharge materials is lithium.

19. An electrochemical cell in accordance with claim 18 wherein:
the metal housing is an elongated cylindrical housing;
the carbon cathode structure is an elongated, cylindrical, tubular member;
the lithium electrode is an elongated, cylindrical member;
the electrically-nonconductive member is an elongated member having a first portion embedded within the elongated, cylindrical lithium electrode and a second portion extending outwardly from the lithium electrode;
the electrically-conductive metal material is disposed on the first portion of the elongated electrically-nonconductive member and in physical and electrical contact with the elongated lithium electrode; and the jumper element is a flexible, electrically-conductive metal element connected between the electrically-conductive metal material and the elongated electrical terminal in the cover.

20. An electrochemical cell in accordance with claim 19 wherein:

the elongated electrically-nonconductive member is a solid, elongated rod.

21. An electrochemical cell in accordance with claim 20 wherein:

the elongated electrically-nonconductive rod is of glass.

22. An electrochemical cell in accordance with claim 20 wherein:

the elongated electrically-nonconductive rod is of a ceramic material.

23. An electrochemical cell in accordance with claim 22 wherein:

the elongated electrically-nonconductive member is an elongated tube defining a central reservoir for receiving and retaining therein an excess of the electrolytic solution.

24. An electrochemical cell in accordance with claim 23 wherein:

the elongated electrically-nonconductive tube is of glass.

25. An electrochemical cell in accordance with claim 23 wherein:

the elongated electrically-nonconductive tube is of a ceramic material.

* * * * *